Jan. 24, 1961 W. S. DUNCAN 2,969,244
CHILD'S COMBINATION VEHICLE AND ROCKING CHAIR
Filed April 17, 1959 2 Sheets-Sheet 1

INVENTOR
WILLIAM S. DUNCAN
BY
ATTORNEYS

Jan. 24, 1961 W. S. DUNCAN 2,969,244
CHILD'S COMBINATION VEHICLE AND ROCKING CHAIR
Filed April 17, 1959 2 Sheets-Sheet 2
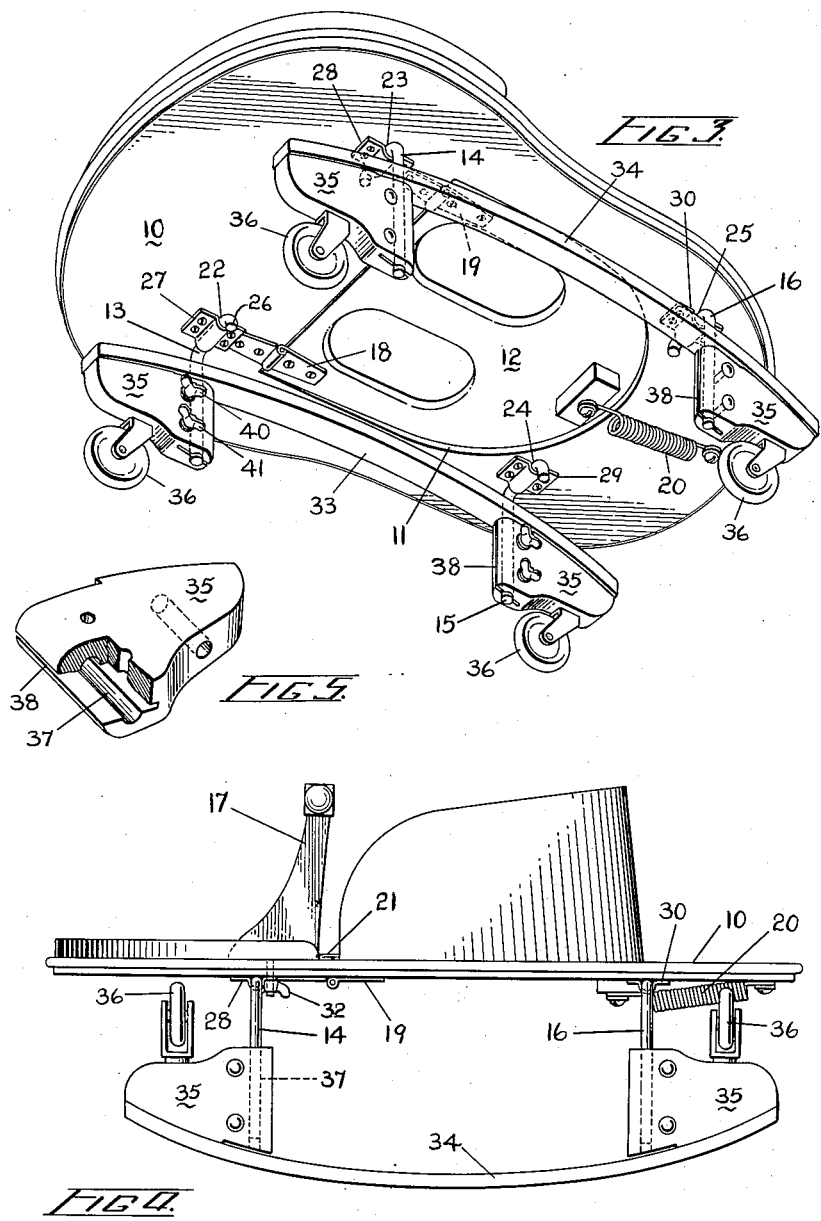

United States Patent Office 2,969,244
Patented Jan. 24, 1961

2,969,244

CHILD'S COMBINATION VEHICLE AND ROCKING CHAIR

William S. Duncan, Elora, Ontario, Canada

Filed Apr. 17, 1959, Ser. No. 807,096

5 Claims. (Cl. 280—8)

This invention relates to a child's combination wheeled vehicle and rocker, hereinafter referred to as a child's vehicle so constructed which can be used by the child as a creeper, walker or rocker and can quickly be converted into a rocker or vice versa.

The object of the invention is to provide a vehicle which can be used by the child in one of several positions such as lying on its stomach, sitting up or standing up.

A further object of the invention is to provide a vehicle with ground gears such as wheels, runners, etc., so that the vehicle can be moved over the ground, the ground gear being arranged to be converted to runners or wheels, as desired.

A further object of the invention is to provide a vehicle in which the ground gear can be easily removed and the legs can be folded so that the vehicle, when not in use, can be stored in a small space.

Other and further objects of the invention will be apparent from the following description which sets forth a preferred embodiment which is illustrated in the accompanying drawings in which:

Figure 3 is a perspective view looking at the underside of the vehicle.

Figure 4 is a side elevation showing the vehicle being used as a rocking chair.

Figure 5 is an enlarged view partly in cross section to shrow the mounting for the legs.

Like characters of reference refer to like parts throughout the specification and drawings.

Figure 1:
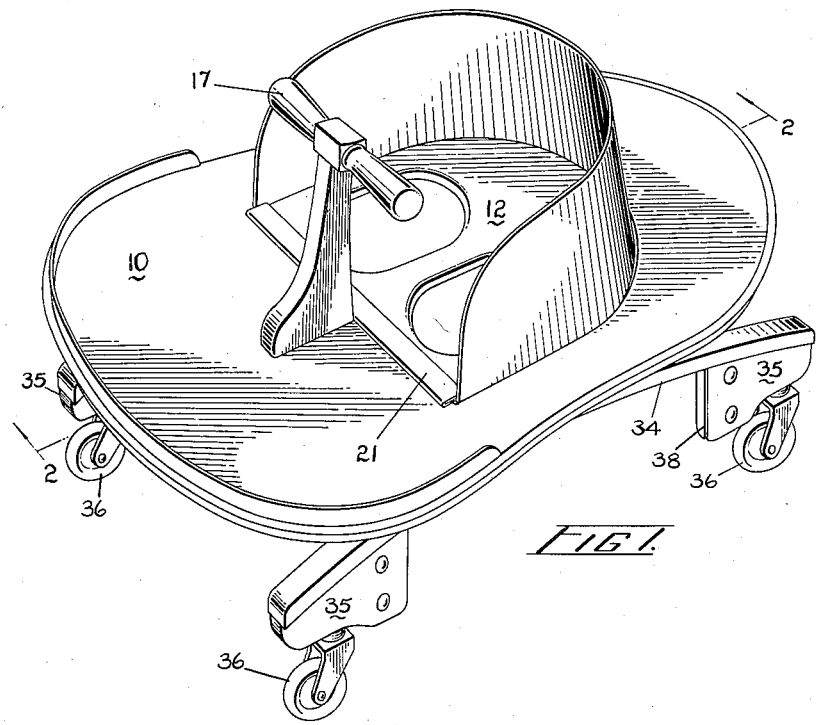
Fig. 1 is a perspective view of the child's vehicle constructed according to and embodying the present invention.

The vehicle illustrated in the drawings comprises a platform 10 made of suitable material such as plywood cut to the desired shape, the platform being formed with a centrally located opening 11 large enough to receive a seat member 12, and supported on four metal legs 13, 14, 15 and 16, mounted on the underside of the platform for folding against the underside of the platform as hereinafter described, a removable handlebar 17 and suitable ground gear removable mounted on the legs as hereinafter more particularly described. By the term ground gear, I mean the elements such as runners, castors or rollers together with support members so that the vehicle may be supported on the floor surface or the ground.

The forward edge of the opening 11 is formed parallel to the transverse axis of the platform and the rearwardly extending edges thereof are preferably at right angles thereto, the rear edge of the opening being curved to conform to the back edge of the seat 12. Mounted within the opening 11 is the seat member 12 which has its forward edge hinged to the platform by means of strap hinges 18, 19 and its rear edge supported by a tension spring 20. The spring will resiliently support the seat in a horizontal position. Adjacent the forward edge of the seat is a pair of openings 17 through which the child's legs may extend when the child is seated. To prevent the child being pinched in the crack between the front edge of the seat and the contiguous edge of the opening, a strip 21 of suitable material is fastened over the crack, the strip being fastened so that it will not interfere with the pivotal movement of the seat. The handlebar 17 is mounted on the platform just in front of the seat member.

Each of the legs 13, 14, 15 and 16 is made of metal such as aluminum and is preferably made of one piece and has one end bent to form axles 22, 23, 24, and 25 respectively, the free ends of the axles each being bent to form a retaining tip 26. The axles 22, 23, 24 and 25 are journaled in bearing plates 27, 28, 29 and 30, fastened to the underside of the platform with the axles lying transversely across the platform. The legs can thus fold against the underside of the platform only in one direction, i.e. towards the front or rear of the platform.

The handlebar 17 is provided at its lower end with a threaded extension 31 which projects through a hole formed in the platform and fastened in position by means of the wing nut 32. The handlebar 17 can thus be removed.

The vehicle is provided with a pair of arcuate runners 33, 34, the runner 33 being removably mounted on the legs 13, 15 and the runner 34 being removably mounted on the legs 14, 16. For that purpose both of the runners 33, 34 are constructed in the same manner and consequently only one runner need be described which will be done with reference to runner 33. Mounted on each end of the runner 33 is a pollow block 35 mounted on the convex side thereof and fastened thereto in any suitable manner. Each block has mounted on the top edge thereof adjacent the outside end, a castor 36 which serves as a wheel when the vehicle is used as a wheeled one. Each of the pillow blocks is formed with a sleeve 37 extending perpendicular to the runner into which the appropriate leg is inserted, the sleeve being formed so that it can be reduced in diameter for clamping against the leg which is inserted therein. For that purpose the pillow block is made of wood and the sleeve is formed by drilling a hole vertically through the pillow block and a kerf 38 is formed in the end of the pillow block so as to extend completely through the sleeve dividing it into two mating, semi-cylindrical parts. The two parts of the sleeve can be clamped against the leg by means of the bolts and wing nuts 40, 41, which are inserted through the pillow block adjacent the sleeve 37. When the legs are inserted in the sleeves, they are held in a vertical position and lose their foldability.

Figure 2:
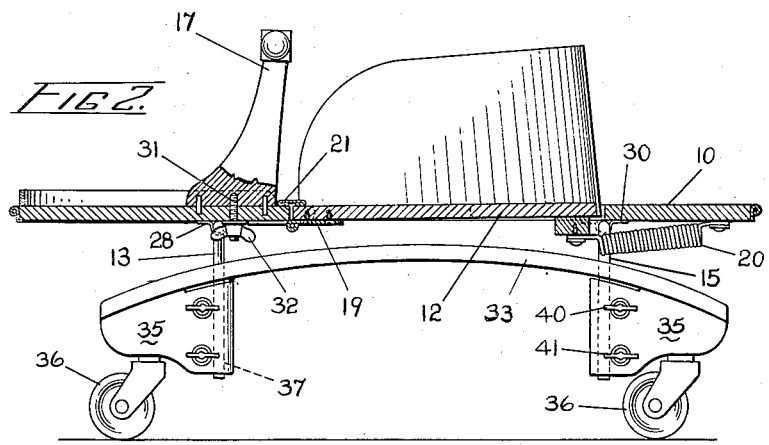
Figure 2 is a cross section view on the line 2—2 of Figure 1.

In Figures 1, 2, 3 and 4, the runner 33 is shown in the position in which it is used as a wheeled vehicle. To change the vehicle into a rocking chair, the wing nuts 40, 41 which hold or retain the legs within the sleeve 37 are loosened permitting the legs to be withdrawn and the runners detached. The runners can then be turned to the position shown in Figure 4, the legs inserted in their respective sleeves and the nuts tightened. The vehicle can then be used as a wheeled one.

It will also be apparent that the height of the platform can be readily adjusted by the relative position of the legs in the sleeves.

What I claim as new and desire to protect by Letters Patent of the United States is:

1. A child's combination wheeled vehicle and rocking chair comprising a platform, a central opening in said platform, a seat resiliently mounted in said opening, two pair of legs carried on the underside of and hingedly mounted on the underside of the platform to fold against the underside of the platform and a reversible ground gear removably mounted on the lower end of each pair of legs, the ground gear comprising an arcuate runner removably mounted on the lower end of each pair and retaining said legs against folding, a castor mounted on each end of the runner on the concave surface thereof whereby the runners may be selectively changed from a position in which the arcuate surface is in contact with the ground to a position in which the wheels are in contact therewith.

2. A child's combination wheeled vehicle and rocker according to claim 1 in which the mounting for removably mounting each runner on its pair of legs comprises a pillow block mounted on each end of the runner to project from the concave surface thereof on which the castor is mounted, a leg receiving sleeve formed in each block perpendicularly therethrough and registering with an orifice formed through the runner, and releasable means securing the legs of each pair in their respective sleeves.

3. A child's combination vehicle and rocking chair according to claim 1 in which the mounting for removably mounting each runner on its pair of legs comprises a pillow block mounted on each end of the runner to project from the concave surface thereof on which the castor is mounted, a leg receiving sleeve formed in each block perpendicularly therethrough and registering with an orifice formed through the runner, a kerf cut perpendicularly in the end of the block dividing said sleeve into two sections and a bolt and nut device inserted through said block adjacent said sleeve whereby said sections can be clamped against said leg.

4. A child's combination vehicle and rocking chair comprising a platform, a central opening in said platform, a seat mounted in said opening, said seat having its forward edge hinged to said platform and its rear edge supported by a spring member, two sets of legs each set consisting of a front and back leg on the same side of the platform, each leg being hingedly mounted on the underside of the platform for folding against the underside thereof in the direction of the front or back of the platform, a pair of arcuate runners, a wheel mounted on the concave side of the runners at each end thereof, each runner being removably mounted on the lower end of each set of legs and retaining the legs against folding, whereby said runners may be selectively changed from a position in which the arcuate surface is in contact with the ground or floor to a position in which the wheels are in contact therewith.

5. A child's combination vehicle and rocking chair according to claim 4 in which the removable mounting for each runner includes a pillow block mounted on the concave side of each runner, a compressible sleeve formed vertically through each of said blocks, the sleeve of each block on the same runner being positioned to register with one of the legs of a set of legs when said legs are vertical to said platform and to further register with an orifice formed through the end of the runner on which said block is mounted, and means for compressing said sleeves against said legs when they are inserted therein.

References Cited in the file of this patent

UNITED STATES PATENTS

| | | |
|---|---|---|
| 405,919 | Straus et al. | June 25, 1889 |
| 1,477,513 | McNeill | Dec. 11, 1923 |
| 1,826,502 | Brown | Oct. 6, 1931 |
| 1,872,216 | Appleby | Aug. 16, 1932 |
| 1,907,321 | Hilstrom | May 2, 1933 |